July 16, 1957 A. J. MONTCHAUSSE ET AL 2,799,754
REGULATING DEVICE FOR ELECTRICAL SWITCHING EQUIPMENT
Filed July 8, 1954 2 Sheets-Sheet 1
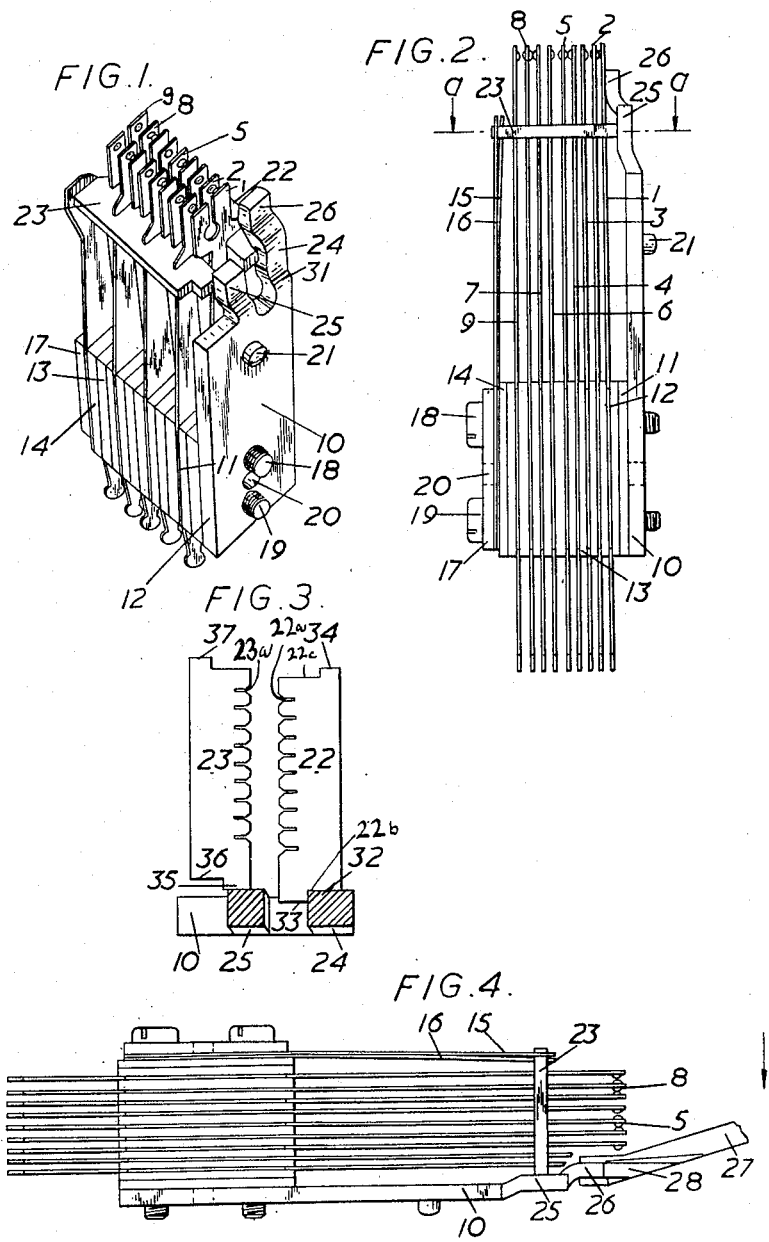
Inventors
A. J. MONTCHAUSSE
D. DAUTRY
By Robert Harding
Attorney July 16, 1957  A. J. MONTCHAUSSE ET AL  2,799,754
REGULATING DEVICE FOR ELECTRICAL SWITCHING EQUIPMENT
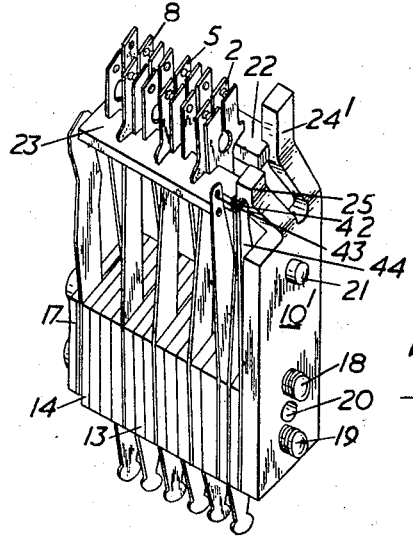
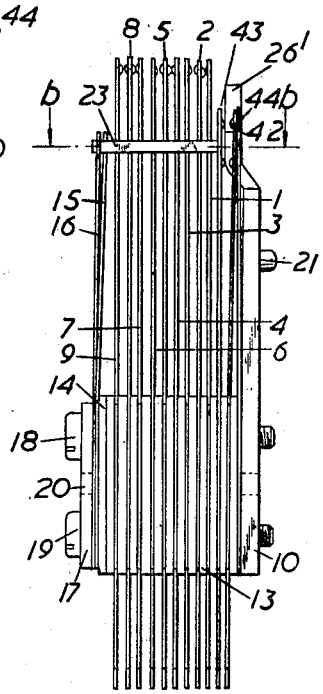
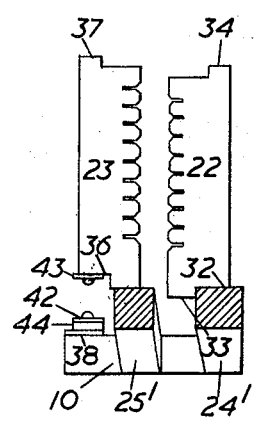
Inventors
A. J. MONTCHAUSSE
D. DAUTRY United States Patent Office 2,799,754
Patented July 16, 1957

2,799,754

REGULATING DEVICE FOR ELECTRICAL
SWITCHING EQUIPMENT

André Jean Montchausse, Paris, and Daniel Dautry, Clamart, France, assignors to International Standard Electric Corporation, New York, N. Y., a corporation of Delaware Application July 8, 1954, Serial No. 442,056

Claims priority, application France August 18, 1953

4 Claims. (Cl. 200—166)

The present invention refers to a regulating device for electrical switching equipment having a fixed contact spring assembly and a movable contact spring assembly, such as electromagnetic relays, crossbar multi-selectors, keys, buttons, jacks or similar devices. These devices usually have a movable actuating element, which, when in operating position, shifts the various contact springs, thus opening certain contacts and closing others. The actuating element may act on a guiding or driving part, such as a guide bar supporting the various movable springs. The fixed contact springs are kept a suitable distance apart by any appropriate means. They may be supported, for example, by a guide bar similar to the one bearing the movable springs. The object of this invention is a simple and inexpensive arrangement permitting accurate adjustment of the respective positions of the fixed and movable springs as well as accurate adjustment of the position of the movable springs with respect to the actuating element without having to reset each of the various springs.

One of the features of the invention lies in adjusting the respective positions of the fixed and movable contact springs and the position of the movable springs with respect to the actuating element by bending one or more of the portions of the supporting part on which the guide bars come to rest.

Another feature of the invention lies in the fact that the supporting part of the contact spring assembly has a readily deformable tongue on which one of the two guide bars comes to rest, the other guide bar resting either on another deformable tongue on said supporting part or on any other solid part of the contact spring assembly, these arrangements permitting the desired adjustment by bending one or both of the tongues.

The two deformable tongues may be obtained, for example, by cutting and cambering the supporting part of the contact spring assembly.

Another feature of the invention lies in the fact that the base of each deformable tongue has a relatively narrow cross-section so that it forms a hinge around which the tongue may bend under the action of an adjusting tool.

Another feature of the invention lies in the fact that each tongue to be bent comprises two different type cambered parts, one on which the guide bar comes to rest and one to which the adjusting tool is applied, the space between the first of said parts and the frame of the device being just wide enough to permit the desired adjustment, the space between the second of said parts and said frame being chosen to permit application and movement of the adjusting tool, these arrangements being designed to reduce the space occupied by the contact spring assembly while making adjustment possible.

In certain electrical multi-contact switching devices a make-first contact is provided, that is to say, one which is operated before any other of the contacts has changed position. The two springs constituting this make-first contact are independent of either of the guide bars bearing the other springs. The movable actuating element acts first on the make-first contact and then, by means of said contact, acts on the movable contact guide bar bearing the other movable springs.

Another feature of the invention lies in the fact that when a make-first contact is provided, the tongue to be bent comprises only one off-set or cambered part on which the fixed contact guide bar rests, the space between said part and the frame of the device being so chosen as to set the make-first contact and to permit operation of the adjusting tool, these arrangements making it possible to use, as supporting part of the contact spring assembly, the same member as in the case where there is no make-first contact, the shape of said supporting part alone being changed.

The arrangements on which this invention is based offer a certain number of advantages. The desired adjustment is accomplished without having to individually reset each of the various springs after they are mounted in the pile-up. This results in a substantial saving in labor. The essential device that makes this result possible, that is to say, the supporting part of the contact spring assembly, may be obtained by simple cutting followed by a bending operation, or in other words by a simple and inexpensive process. The same tool may be used for cutting the supporting part, either in the case where the switching device comprises a make-first contact or in the case where it does not, since only the bending operations are different. Mounting is made easy by the fact that the guide bar or bars rest on the deformable parts. This is a great deal simpler than if the bars had to be assembled with the deformable elements.

Besides, when the switching device is of the single-throw type and has only front contacts, it is possible by suitable adjustment of the deformable part supporting the fixed bar to bring the fixed springs closer to the movable springs. This reduces the path of the movable springs, making it possible, in the case of electromagnetic relays, for example, to realize a smaller operating gap and consequently improvement in operating speed.

Various other features will become apparent from the description to follow, which is given as a nonlimitative example and refers to the attached drawing, in which:

Fig. 1 shows a contact spring assembly and its associated support in perspective;

Fig. 2 is an elevation of the contact spring assembly and support of Fig. 1, with the actuating element assumed to be raised;

Fig. 3 is a large-scale partial section view along a—a of Fig. 2 representing two guide bars, the one fixed and the other movable, in home position;

Fig. 4 is a view showing the manner in which the adjustment is made;

Figs. 5, 6 and 7 are variants of Figs. 1, 2 and 3 in the case where a make-first contact is provided.

With reference to Figs. 1 to 4 a first embodiment of the device on which this invention is based will now be described. In this example the case of a contact spring assembly belonging to an electromagnetic relay will be considered. The assembly of contact springs 1 to 9 comprises a non-movable assembly mounted on supporting part 10. This assembly comprises insulating plates 11 and 12, contact springs 1 to 9 separated by isolating plates 13 of the same width, other isolating plates 14, two spring blades 15 and 16 and tightening plate 17. The various parts making up this set are assembled and then attached to supporting part 10 by means of two screws 18 and 19. Hole 20 is for the screw that attaches the set comprised of the fixed assembly and its support to the yoke of the relay. The drawing does not show the coil, the yoke or the armature of the relay since these various elements are not part of the invention. A stud 21 fits into a corresponding hole in the yoke in order to prevent any rotary movement of support 10 with respect to said yoke. A pair of guide bars 22 and 23 are provided for carrying the fixed and movable contacts, respectively, and the contour of said bars is clearly shown in Fig. 3.

The contact springs rest freely in the notches of the guide bars 22 and 23 but without play. Guide bar 22 carries the fixed contact springs 1, 3, 4, 6, 7 and 9; bar 23 carries the movable contact springs 2, 5 and 8. The end of support part 10 where the two guide bars find support is bifurcated to form two tongues 24 and 25, each of which supports a different one of the guide bars. Because of the cambering given them in their manufacture these tongues are slightly off-set from the yoke on which supporting part 10 rests so that they may be bent in one direction or the other in the plane of the contact spring pile-up. The guide bars, as shown in Fig. 3, are provided with a series of spaced notches, the guide bar 22 having notches 22a and the guide bar 23 having notches 23a. The notches 22a must be out of alignment with notches 23a and are opposite points equidistant from adjacent notches 23a. Thus, any adjustment must aim to provide the relative placement of the guide bars described in the last sentence. It will be appreciated that movement of guide bar 22 vertically with respect to bar 23 will enable the realization of the desired relative positioning of the notches, and consequently the contact springs carried therein. Since each guide bar maintains each of the contact springs in a fixed position relative to the adjacent springs carried by it, it is plain that movement of a guide bar changes the position of all contact springs carried by it with respect to the cooperating contact springs carried by the other guide bar, and a precision adjustment may be obtained without the necessity of resetting each spring separately. Because of the space taken up by the contact spring assembly, the space between the tongues and the yoke created by the off-set is set at the maximum adjusting amplitude and may be too narrow to admit the tool used to bend the tongues; tongue 24, the only one needed to be adjusted in practice, is extended by means of part 26, which is sufficiently far away from the yoke to allow the tool to be brought into place and used.

Fig. 4 shows a tool, used for adjusting the deformable tongues. This tool comprises a handle 27, having a groove 28; at one end thereof, which end is bent at an angle. The tool is applied in such a way that extension 26 of the tongue catches in said groove. By giving the tool a rotary movement either in the direction of the arrow or in the opposite direction, the tongue is bent thereby altering the position of guide bar 22 and therefore affects the position of all the fixed contact springs. Base 31 of the deformable tongue has a narrow cross-section to form a sort of hinge portion around which the tongue can readily bend when the tool is applied. The distance from the resting point of the guide bar to the hinge portion is considerably less than the distance between the portion 26 where the tool comes into play and said hinge. This makes fine adjustment of the resting point easier.

The adjustment of a single tongue is sufficient to define the relative position of the two guide bars. In the example given it has been assumed that only the tongue supporting the fixed guide bar has been acted upon; therefore extension 26 has been provided on this tongue and not on the other and permits bending by means of tool 27. Regulating the position of the movable guide bar by the arm is accomplished by bending this arm without touching the tongue supporting the movable bar. The two adjustments are independent and do not affect each other.

According to a variant, the position is first regulated by bending the tongue supporting the movable bar and then adjusting the relative position of the two bars by acting upon the tongue supporting the fixed guide bar.

End 22b of guide bar 22 (Figs. 2 and 3) rests on tongue 24 under pressure of spring 15 applied to its opposite end 22c with its shoulder 32 and its tip 33 is lodged between the two tongues 24 and 25. The other tip 34 of the fixed bar is lodged in a properly shaped complementary hole provided in spring 15. The bar 22 is thus held in position by tongue 24, spring 15 and the fixed contact springs 1, 3, 4, 6, 7 and 9 themselves. Guide bar 23 bearing the movable contact springs 2, 5 and 8 is exactly the same as the bar bearing the fixed contact springs but is arranged slightly differently. When the springs are in unactuated position, tip 35 of said bar rests on tongue 25 and the actuating element (not shown) comes to rest facing shoulder 36 of the bar. The other tip 37 comes to rest in a hole provided on an opposing spring 16, just as in the case of the fixed guide bar. The fixed and movable bars are thus placed with respect to one another in such positions that with the same bars it is possible to obtain all desired contact combinations within the limit of the number of available notches. This is the explanation given in the request for a certificate of addition filed by applicants on December 31, 1952, for "Electromagnetic Relay" (inventors: André Jean Montchausse and Daniel Dautry), main Patent No. 1,036,612, filed December 15, 1950.

In Fig. 3 movable guide bar 23 is shown in unactuated position. When the relay energizes, the actuating element acts on shoulder 35 of said bar and moves it upwardly, thus driving the various movable springs.

Referring to Figs. 5, 6 and 7, the case will now be discussed where a make-first contact is provided, that is to say, a contact that comes into play before any of the other contacts have changed position. For supporting part 10' of the contact spring assembly the same member is used as in the case described above, but in making tongues 24' and 25' their cambering is changed as shown in the perspective view of Fig. 5. These tongues are sufficiently spaced from the relay yoke to allow the placing of a make-first contact consisting of springs 42 and 43. When the relay energizes, the actuating element (not shown) acts first on contact 42 by means of isolating resilient element 44 provided to prevent a short circuit between the armature and the make-first contacts. Since contacts 42 and 43 are applied one against the other, the actuating element arm continues its course urging contacts 42 and 43 against bar 23 and thus acts on movable bar 23.

Since the resting point of the guide bars in this case is farther distant from the yoke than in the case where there is no make-first contact, it is unnecessary to provide the tongues with a double camber. There is sufficient space between these tongues and the relay yoke to allow introduction of the adjusting tool 27.

It is, of course, understood that the preceding descriptions have been given only as a non-limitative example and that a certain number of variants could be provided without departing from the scope of the invention. The desired adjustment may be made by acting either on the deformable element supporting the fixed guide bar, on the one supporting the movable guide bar or by a combination of the two methods. The bar whose position is not to be adjusted may rest either on a tongue, on the part supporting the contact spring assembly itself or on any solid part of the contact spring assembly. The fixed contact springs may either be guided by a bar or be taken as a whole as the result of casting or they may be guided by any other method whatever. The deformable members may be made differently; they may, for example, be carried by a part that would be integral with the contact spring assembly, all the devices used to change the shape of one or more of the members supporting the guiding part or parts of the contact springs falling within the scope of the invention. Finally, the description has been given for the case of a relay but in a more general sense the invention refers to all electrical switching devices having movable contact springs operated by a bar and having fixed contact springs. It is particularly applicable in the case of crossbar multi-selector contact spring assemblies and in the case of keys, buttons, jacks or similar devices.

What is claimed is:

1. An electrical contact spring assembly comprising a support member in a first plane, a pile-up of cooperating fixed and movable contact springs affixed to said support means, a pair of guide members of insulating material, one of said members adapted to maintain said movable springs in a first predetermined position, the other of said members adapted to maintain said fixed springs in a second predetermined position with respect to said movable contacts, said support member characterized in that it comprises a main portion and an elongated portion in a second plane off-set from the plane of said main portion, and deformable means intermediate said elongated portion and said main portion for permitting the variation of said second plane, one of said members adapted to rest upon said elongated portion and adapted to be adjustably moved with respect to said other member upon variation of said second plane.

2. An electrical contact spring assembly as claimed in claim 1, wherein said deformable means comprises a segment of said member having a lesser cross-section than said elongated portion or the main body of said member.

3. An electrical contact spring assembly as claimed in claim 1, wherein said elongated portion is bifurcated, each bifurcation adapted to be varied with respect to the other and with respect to the main body of said member, a different one of said guides adapted to normally abut against each of said bifurcations.

4. An electrical contact spring assembly as claimed in claim 3, wherein one of said bifurcations is off-set from the surface of said member a distance sufficient to permit the interposition of a make-first contact between one of said guides and the actuating element for actuating said assembly.

References Cited in the file of this patent

UNITED STATES PATENTS

| | | |
|---|---|---|
| 847,555 | Craft | Mar. 19, 1907 |
| 2,526,455 | Bonanno | Oct. 17, 1950 |
| 2,612,367 | Blomquist | Sept. 30, 1952 |
| 2,617,907 | Umbarger et al. | Nov. 11, 1952 |